(12) United States Patent
Lee et al.

(10) Patent No.: US 8,229,517 B2
(45) Date of Patent: Jul. 24, 2012

(54) DATA TRANSMISSION/RECEPTION METHOD

(75) Inventors: Young-Dae Lee, Gyeonggi-Do (KR);
Sung-Duck Chun, Gyeonggi-Do (KR);
Sung-Jun Park, Gyeonggi-Do (KR);
Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 184 days.

(21) Appl. No.: 12/450,966

(22) PCT Filed: Apr. 29, 2008

(86) PCT No.: PCT/KR2008/002422
§ 371 (c)(1),
(2), (4) Date: Oct. 20, 2009

(87) PCT Pub. No.: WO2008/133469
PCT Pub. Date: Nov. 6, 2008

(65) Prior Publication Data
US 2011/0039536 A1  Feb. 17, 2011

(30) Foreign Application Priority Data
Apr. 11, 2008  (KR) .................. 10-2008-0033856

(51) Int. Cl.
*H04B 1/38* (2006.01)
(52) U.S. Cl. .................... 455/574; 455/343.1
(58) Field of Classification Search .............. 455/574, 455/343.1–343.6; 370/328, 349
See application file for complete search history.

(56) References Cited

U.S. PATENT DOCUMENTS

| | | | |
|---|---|---|---|
| 4,205,200 A | 5/1980 | Parikh et al. | |
| 6,725,267 B1 | 4/2004 | Hoang | |
| 6,795,419 B2 | 9/2004 | Parantainen et al. | |
| 7,245,707 B1 | 7/2007 | Chan | |
| 7,443,813 B2 | 10/2008 | Hwang et al. | |
| 7,525,908 B2 | 4/2009 | Olsson et al. | |
| 7,551,643 B2 | 6/2009 | Yeo et al. | |
| 7,680,058 B2 | 3/2010 | Seurre et al. | |
| 7,769,351 B2 | 8/2010 | Kwak et al. | |
| 7,801,527 B2 | 9/2010 | Putcha | |
| 7,864,731 B2 | 1/2011 | Forsberg | |
| 7,899,451 B2 | 3/2011 | Hu et al. | |
| 7,912,471 B2 | 3/2011 | Patabandi et al. | |
| 7,916,697 B2 | 3/2011 | Eklund | |
| 7,958,542 B2 | 6/2011 | Herrmann | |
| 8,064,676 B2 | 11/2011 | Li et al. | |

(Continued)

FOREIGN PATENT DOCUMENTS

AU  2007314859 B2  5/2008

(Continued)

OTHER PUBLICATIONS

NTT DoCoMo, Inc.: "MAC PDU Structure for LTE" R2-070280, 3GPP TSG RAN WG2, 56bis, Jan. 15-19, 2007, XP50133369.

(Continued)

*Primary Examiner* — Lana N Le
(74) *Attorney, Agent, or Firm* — McKenna Long & Aldridge LLP (57) ABSTRACT

A method for receiving data from a radio network by a terminal includes: receiving downlink data while the terminal operates according to a first discontinuous period; transmitting a response message with respect to the downlink data; and operating according to a second discontinuous period after transmitting the response message.

4 Claims, 5 Drawing Sheets

U.S. PATENT DOCUMENTS

| | | |
|---|---|---|
| 2001/0017850 A1 | 8/2001 | Kalliokulju et al. |
| 2001/0026543 A1 | 10/2001 | Hwang |
| 2001/0034791 A1 | 10/2001 | Clubb et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2003/0007490 A1 | 1/2003 | Yi et al. |
| 2003/0007512 A1 | 1/2003 | Tourunen et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2004/0014452 A1 | 1/2004 | Lim et al. |
| 2004/0042507 A1 | 3/2004 | Pelletier et al. |
| 2004/0087320 A1* | 5/2004 | Kim et al. .................. 370/328 |
| 2004/0100940 A1* | 5/2004 | Kuure et al. ................. 370/349 |
| 2004/0117860 A1 | 6/2004 | Yi et al. |
| 2004/0121771 A1 | 6/2004 | Song et al. |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0229605 A1 | 11/2004 | Hwang et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1* | 2/2005 | Jami et al. .................... 455/574 |
| 2005/0041610 A1 | 2/2005 | Lee et al. |
| 2005/0041681 A1 | 2/2005 | Lee et al. |
| 2005/0063347 A1 | 3/2005 | Sarkkinen et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1* | 7/2005 | Waters .................... 455/343.1 |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0094431 A1 | 5/2006 | Willenegger et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0165045 A1 | 7/2006 | Kim et al. |
| 2006/0203760 A1* | 9/2006 | Fukui et al. ................... 370/328 |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041382 A1 | 2/2007 | Vayanos et al. |
| 2007/0047452 A1 | 3/2007 | Lohr |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0155389 A1 | 7/2007 | Zhang |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0206531 A1 | 9/2007 | Paiukoski et al. |
| 2007/0248075 A1 | 10/2007 | Liu et al. |
| 2007/0258591 A1 | 11/2007 | Terry et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0267126 A1 | 10/2008 | Vujcic |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0287091 A1* | 11/2008 | Suzuki et al. ............... 455/343.4 |
| 2008/0310452 A1 | 12/2008 | Vedantham et al. |
| 2009/0022107 A1 | 1/2009 | Kapoor et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0207771 A1 | 8/2009 | Lindskog |
| 2009/0239538 A1 | 9/2009 | Motegi et al. |
| 2009/0264164 A1* | 10/2009 | Chun et al. .................... 455/574 |
| 2009/0318170 A1 | 12/2009 | Lee et al. |
| 2010/0027413 A1 | 2/2010 | Park et al. |
| 2010/0061330 A1 | 3/2010 | Hanov |
| 2010/0128669 A1 | 5/2010 | Chun et al. |
| 2010/0165901 A1 | 7/2010 | Kim |
| 2010/0227614 A1 | 9/2010 | Chun |
| 2010/0238799 A1 | 9/2010 | Sebire |
| 2010/0238903 A1 | 9/2010 | Kitazoe |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2012/0002589 A1 | 1/2012 | Saifullah et al. |

FOREIGN PATENT DOCUMENTS

| | | |
|---|---|---|
| CN | 1719932 | 1/2006 |
| EP | 1 148 735 | 10/2001 |
| EP | 1 168 877 | 1/2002 |
| EP | 1 209 938 | 5/2002 |
| EP | 1 304 898 | 4/2003 |
| EP | 1 315 356 | 5/2003 |
| EP | 1315356 A2 | 5/2003 |
| EP | 1 318 632 | 6/2003 |
| EP | 1 337 124 A2 | 8/2003 |
| EP | 1 372 310 | 12/2003 |
| EP | 1511245 A2 | 3/2005 |
| EP | 1 720 322 A1 | 11/2006 |
| EP | 1 720 373 | 11/2006 |
| EP | 1932380 | 6/2008 |
| JP | 6-006294 | 1/1994 |
| JP | 2003-087180 | 3/2003 |
| JP | 2003-235064 | 8/2003 |
| JP | 2005-354488 | 12/2005 |
| JP | 2006-067115 | 3/2006 |
| JP | 2007-165635 | 6/2007 |

| | | |
|---|---|---|
| JP | 2008-539678 | 11/2008 |
| JP | 2009-540721 | 11/2009 |
| JP | 2009-542100 | 11/2009 |
| KR | 10-2001-0105240 | 11/2001 |
| KR | 10-2004-0039944 | 5/2004 |
| KR | 10-2004-0048675 | 6/2004 |
| KR | 10-2005-0008440 | 1/2005 |
| KR | 10-2005-0016053 A | 2/2005 |
| KR | 10-2005-0027972 | 3/2005 |
| KR | 10-2005-0096763 | 10/2005 |
| RU | 2 249 917 | 4/2005 |
| WO | WO 00/11878 | 3/2000 |
| WO | WO 00/54521 | 9/2000 |
| WO | WO 00/74416 | 12/2000 |
| WO | WO 01/05050 | 1/2001 |
| WO | WO 2004/043099 | 5/2004 |
| WO | WO 2004/064272 | 7/2004 |
| WO | WO 2006/049441 | 5/2006 |
| WO | WO 2006/075820 A1 | 7/2006 |
| WO | WO 2006/104344 | 10/2006 |
| WO | WO 2006/109851 | 10/2006 |
| WO | WO 2006/116620 | 11/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO2008/054103 A1 | 5/2008 |
| WO | WO 2008/111684 | 9/2008 |
| WO | WO 2009/084998 A1 | 7/2009 |

OTHER PUBLICATIONS

Catt, Ritt: Enhancement to Buffer Status Reporting, R2-071345, 3GPP TSG-RAN WG2, 57bis, St. Julian's, Malta, Mar. 26-30, 2007, XP50134291.
Nokia Corporation, Nokia Siemens Networks: "Mac Header Format" 3GPP TSG-RAN WG2 Meeting #59bis; R2-073891; Shanghai, China, Oct. 8-12, 2007, XP-002602993.
LG Electronics Inc: "Support or VoIP over MAC-hs/ehs"; 3GPP TSG-RAN WG2#57bis; R2-071542; St. Julian's, Malta; Mar. 26-30, 2007, XP-50134474A.
Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP-011184637.
Alcatel-Lucent: "DL Control Signaling and Multiplexing for VoIP" 3GPP TSG RAN WG1 Meeting #48bis; R1-071721; St. Julians, Malta Mar. 26-30, 2007, XP-002460800.
LG Electronics Inc. "PDCP retransmissions" 3GPP TSG-RAN WG2 #59 Aug. 19-Aug. 24, 2007 Athens, Greece, R2-073041, XP50135778A.
LG Electronics Inc. "PDCP Structure and Traffic Path" 3GPP TSG-RAN WG2 #59 Aug. 20-Aug. 24, 2007 Athens, Greece, R2-073259, XP50135985A.
LG Electronics Inc. "Contents of PDCP Status Report" 3GPP TSG-RAN WG2 #59 Oct. 8-Oct. 12, 2007 Shanghai, China, R2-07xxxx, XP2580785A.
Asustek: "Granularity consideration for variable RLC PDU sizes" 3GPP Draft; R2-070336 Granularity Consideration for Variable RLC PDU Sizes, $3^{rd}$ Generation Partnership Project (3GPP), vol. RAN WG2, No. Sorrento, Italy; 20070112, Jan. 12, 2007, XP050133423.
"$3^{rd}$ Generation Partnership Project; Technical Specification Group Radio Access Network; Medium Access Control (MAC) protocol specification (Release 7)"3GPP Standard; 3GPP TS 25.321, $3^{rd}$ Generation Partnership Project (3GPP), No. V7.4.0, Mar. 1, 2007, pp. 1-126, XP050367709.

Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637.
NTT DoCoMo, Inc.: "Views on DRX/DTX control in LTE", 3GPP TSG RAN WG2 #56, Nov. 6-10, 2006, Riga, Latvia, R2-063397.
Nokia: "Active mode DRX details", 3GPP TSG RAN WGx Meeting #55, Oct. 9-13, 2006, Seoul, Korea, R2-062753.
Email Rapporteur (Nokia): "DRX in E-UTRAN", 3GPP TSG-RAN WG2 Meeting #57, Feb. 12-16, 2007, St. Louis, Missouri, R2-070463.
Bosch: "header compression signalling" 3GPP Draft; Header Compression Signalling, $3^{rd}$ Generation Partnership Project (3GPP), Mobile Competence Centre; vol. RAN WG2, No. Sophia Antipolis, France; 19991129, Nov. 29, 1999, XP050114120.
"$3^{rd}$ Generation Partnership Project; Technical Specification Group radio Access Network; Packet Data Convergence Protocol (PDCP) specification (Release 7)" 3GPP Standard; 3GPP TS 25.323, $3^{rd}$ Generation Partnership Project (3GPP), Mobile Competence Centre; 650, Route Des Lucioles; F-06921 Sophia-Antipolis Cedex; France, No. V7.4.0, Mar. 1, 2007, pp. 1-44, XP050367856.
Nokia, "Requirements for redirection in E-UTRAN", 3GPP TSG-RAN WG2 Meeting #56-bis, R2-070107, Jan. 2007.
IPWireless, "Layer 2 functions for LTE", 3GPP TSG RAN WG2 #48bis, R2-052377, Oct. 2005.
Samsung, "Selective forwarding/retransmission during HO", 3GPP TSG-RAN2 Meeting #56bis, R2-070130, Jan. 2007.
Samsung, "Re-use of PDCP SN at ARQ level ?", 3GPP TSG-RAN2 Meeting #53bis, R2-061829, Jun. 2006.
Panasonic, "MAC PDU format for LTE", 3GPP TSG RAN WG2#56bis, R2-070096, Jan. 2007.
LG Electronics Inc., "Relative Buffer Status Reporting", 3GPP TSG-RAN2 Meeting #46bis, R2-050852, Apr. 2005.
IP Wireless: "Contention Resolution in Non-synchronous RACH Access", RAN2 #54, Tallinn, Estonia, Aug. 28-Sep. 1, 2006, R2-062269.
LG Electronics: "Discussion on Message 4 in Random Access", 3GPP TSG RAN WG2 #57, St. Louis, Missouri, Feb. 15-19, 2007, R2-070519.
LG Electronics: "Discussion on Message 4 in Random Access", 3GPP TSG RAN WG2 #58, Kobe, Japan, May 7-11, 2007, R2-071923.
LG Electronics: "Discussion on Message 4 in Random Access", 3GPP TSG RAN WG2 #57bis, St. Julian's, Malta, Mar. 26-30, 2007, R2-071456.
NTT DoCoMo, Inc: "E-mail discussion on U-plane ciphering location for LTE", 3GPP TSG RAN WG2 #57bis, St. Julian's, Malta, Mar. 26-30, 2007, R2-071293.
LG Electronics: "U-plane ciphering at MAC / Physical Layer", 3GPP TSG RAN WG2 #57bis, St. Julian's, Malta, Mar. 26-30, 2007, R2-071550.
Ericsson: "MAC header for Improved L2 support for high data rates", 3GPP Draft; $3^{rd}$ Generation Partnership Project (3GPP), Mobile Competence Centre; 650, Route Des Lucioles; F-06921 Sophia-Antipolis Cedex; France, RAN WG2, St. Louis, USA; 20070209, Feb. 9, 2007, XP050133836; R2-070810.
"$3^{rd}$ Generation Partnership Project; Technical Specification Group Radio Access Network; Evolved Universal terrestrial radio Access (E-UTRA) Medium Access Control (MAC) protocol specification (Release 8)", 3GPP Standard; 3GPP TS 36.321, Sophia-Antipolis, France, No. V8.1.0, Mar. 1, 2008, XP050377617.
LG Electronics: "3GPP Draft; UL Timing Control Related to Contention Resolution_R4", $3^{rd}$ Generation Partnership Project (3GPP), Shenzhen, China, Mar. 31-Apr. 4, 2008, R2-081607, XP50139334.

* cited by examiner

DATA TRANSMISSION/RECEPTION METHOD

This application claims priority to International Application No. PCT/KR2008/002422 filed on Apr. 29, 2008, which claims priority to Provisional Application No. 60/915,417 filed on May 1, 2007 and Korean Patent Application No. 10-2008-0033856 filed on Apr. 11, 2008, all of which are incorporated by reference for all purposes as if fully set forth herein.

TECHNICAL FIELD

The present invention relates to a data transmission/reception method and, more particularly, to a discontinuous data reception method.

BACKGROUND ART

Figure 1:
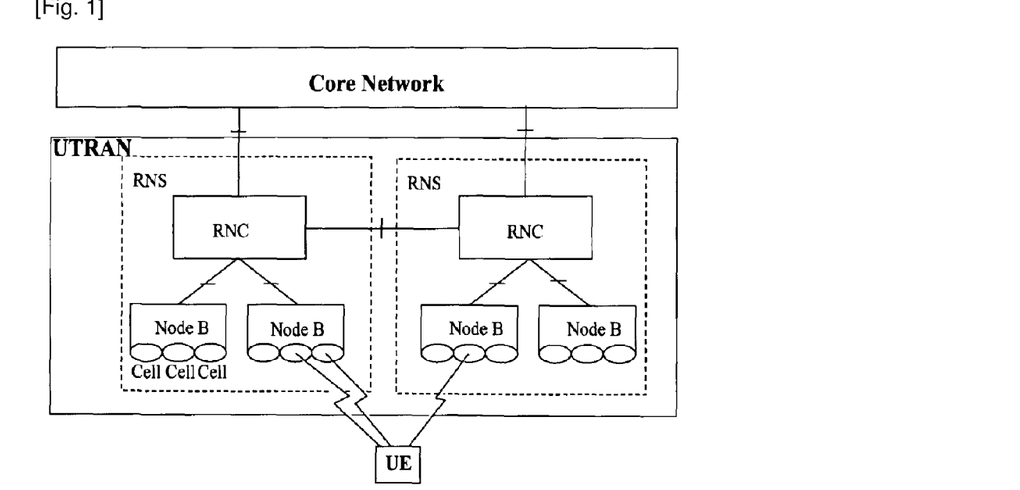
FIG. 1 illustrates an exemplary basic structure of a UMTS (Universal Mobile Telecommunications System) according to the present invention and the related art.

FIG. 1 illustrates an exemplary basic structure of a UMTS (Universal Mobile Telecommunications System) according to the present invention and the related art.

As shown in FIG. 1, the UMTS includes a terminal (user equipment (UE)), a UTRAN (UMTS Terrestrial Radio Access Network), and a core network (CN). The UTRAN includes one or more radio network sub-systems (RNSs). Each RNS includes a radio network controller (RNC) and a plurality of base stations (Node-Bs) managed by the RNC. One or more cells exist for a single Node B.

Figure 2:
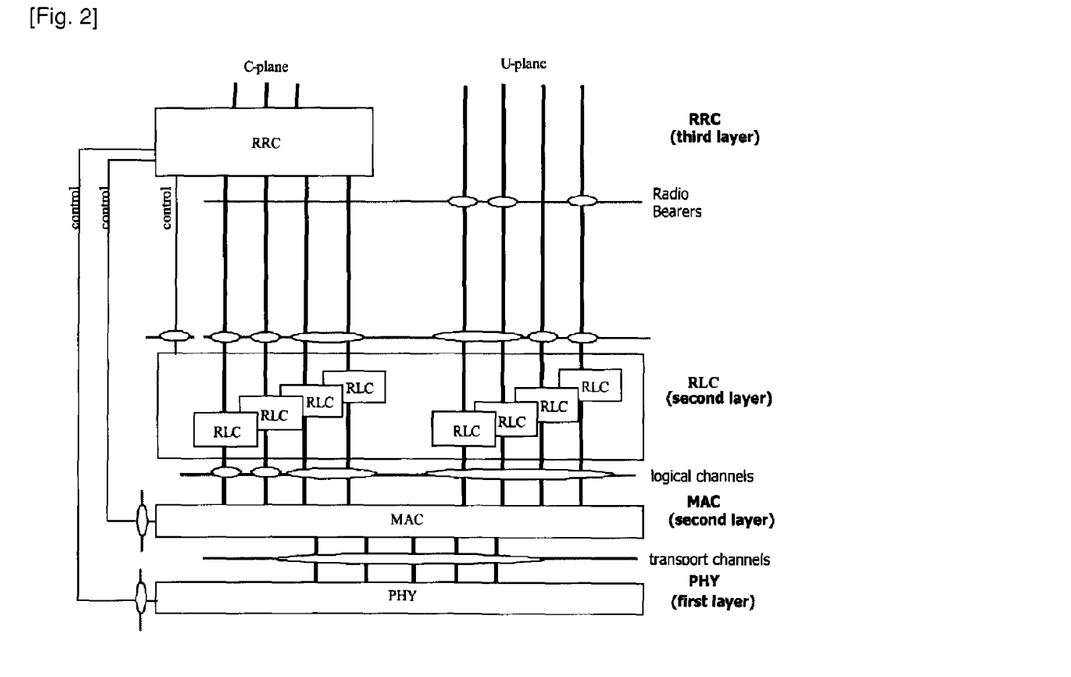
FIG. 2 illustrates a radio interface protocol architecture based on a 3GPP radio access network specification between the UE and the UTRAN.
Figure 3:
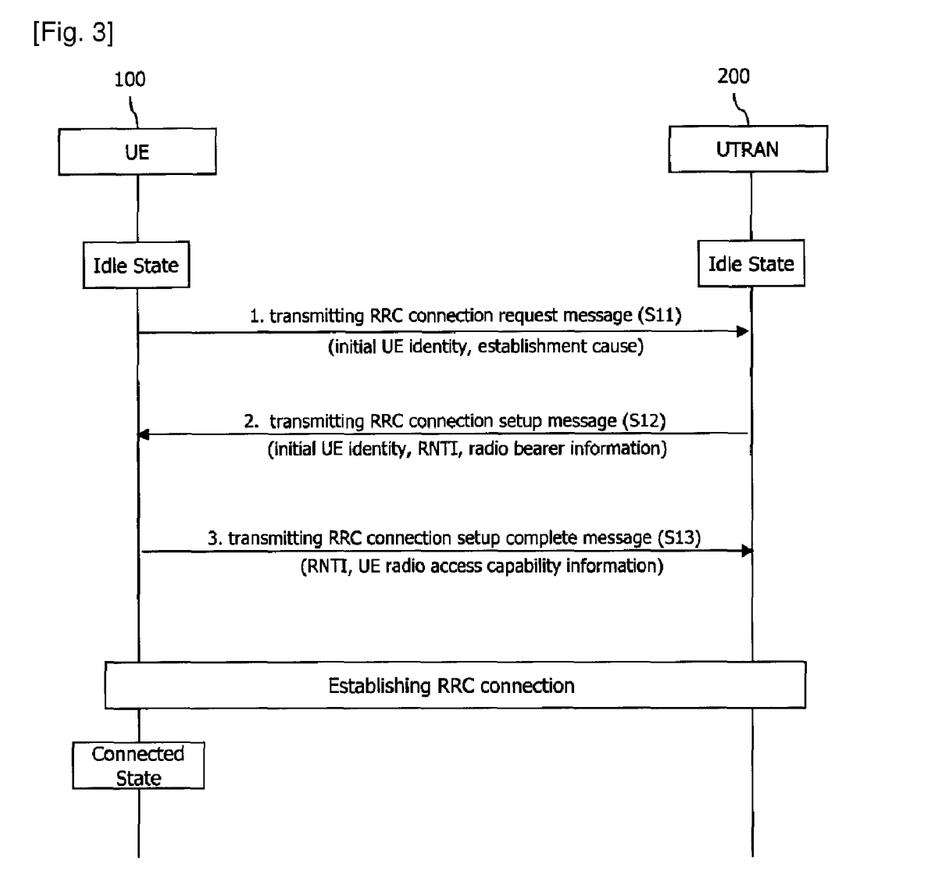
FIG. 3 is an exemplary view showing a process of establishing a connection between RRC layers of the terminal and the UTRAN as shown in FIG. 2.

FIG. 2 illustrates a radio interface protocol architecture based on a 3GPP radio access network specification between the UE and the UTRAN, and FIG. 3 is an exemplary view showing a process of establishing a connection between RRC layers of the terminal and the UTRAN as shown in FIG. 2.

As shown in FIG. 2, the radio interface protocol has horizontal layers comprising a physical layer, a data link layer, and a network layer. Further, the radio interface protocol has vertical planes comprising a user plane (U-plane) for transmitting data information and a control plane (C-plane) for transmitting control signals (signaling). The protocol layers as shown in FIG. 2 can be divided into a first layer (L1), a second layer (L2), and a third layer (L3) based on three lower layers of an open system interconnection (OSI) standard model widely known in communication systems.

Each layer in FIG. 2 will be described in more detail as follows.

The first layer (L1), namely, a physical layer, provides an information transfer service to an upper layer by using a physical channel. The physical layer is connected to an upper layer called a medium access control (MAC) layer via a transport channel. Data is transferred between the MAC layer and the physical layer via the transport channel. Meanwhile, between different physical layers, namely, between a physical layer of a transmitting side and that of a receiving side, data is transferred via the physical channel.

Physical channels of the transmitting side and the receiving side include an SCH (Synchronization Channel), a PCCPCH (Primary Common Control Physical Channel), an SCCPCH (Secondary Common Control Physical Channel), a DPCH (Dedicated Physical Channel), a PICH (Paging Indicator Channel), etc.

The PICH is divided into 10 ms-long PICH frames, and a single PICH frame consists of 300 bits. The first 288 bits of a single frame are used for the UE-dedicated PICH. Namely, the first 288 bits are used to transmit one or more UE-dedicated paging indicators (PIs). Here, the UE-dedicated PIs are used to inform a particular UE that a paging message for the particular UE will be transmitted via the PCH. The rear 12 bits of the single PICH frame are not transmitted. Thus, for the sake of convenience, 288 bits corresponding to the front portion of the PICH channel is defined as a UE PICH, and 12 bits corresponding to the rear portion is defined as a PICH unused part.

The second layer, namely, a data link layer includes a medium access control (MAC) layer and a radio link control (RLC) layer. The MAC layer provides a service to the RLC layer, via a logical channel. The RLC layer of the second layer may support reliable data transmissions and may perform segmentation and/or concatenation on RLC service data units (SDUs) delivered from an upper layer.

A radio resource control (RRC) layer located at the lowest portion of the third layer is defined only in the control plane, handles establishment, reconfiguration and release of radio bearers (RBs), and also handles controlling of transport channels and physical channels. The radio bearer refers to a service provided by the second layer (L2) for data transmission between the terminal and the UTRAN. In general, establishing the radio bearer refers to defining the protocol layers and the characteristics of the channels required for providing a specific service, and configuring respective substantial parameters and operation methods.

Meanwhile, as shown in FIG. 3, in order for the terminal to establish RRC connection with the UTRAN, an RRC connection procedure should be performed. The RRC connection procedure is as follows. When the terminal transmits an RRC connection request message to the UTRAN (S11), the UTRAN transmits an RRC connection setup message to the terminal (S12), and the terminal transmits an RRC connection setup complete message to the UTRAN (S13).

As shown in FIG. 3, an idle state and an RRC connected state exist according to the RRC connection as shown in FIG. 3.

The RRC connected state refers to a state of the terminal in which the RRC layer of the terminal and that of the UTRAN are connected to exchange an RRC message to each other. The idle state refers to a state of the terminal in which the RRC layer of the terminal and that of the UTRAN are not connected.

The RRC connected state may be classified into a URA_PCH state, a CELL_PCH state, a CELL_FACH state and a CELL_DCH state.

When the terminal is in the CELL_DCH state or in the CELL_FACH state, the terminal continuously receives data from the UTRAN. If, however, the terminal is in an idle state, in a URA (UTRAN Registration Area)—PCH state, or in the CELL_PCH state, in order to reduce power consumption, the terminal discontinuously receives a PICH (Paging Indicator Channel) which is a physical channel, an SCCPCH (Secondary Common Control Physical Channel) which is a physical channel (a PCH (Paging Channel) which is a transport channel is mapped to the SCCPCH) by using a DRX (Discontinuous Reception) method. During other time intervals than the time duration while the PICH or the SCCPCH is received, the terminal is in a sleeping mode.

In the related art, the terminal using the DRX method wakes up in the sleeping mode at every CN domain specific DRX cycle length or at every UTRAN specific DRX cycle length to receive the UE-dedicated PI (Paging Indicator) on the PICH channel. Here, the UE-dedicated PI in the related art is used to inform a particular UE that a paging message for the particular UE will be transmitted to the particular UE via the PCH channel.

Meanwhile, the terminal using the DRX method uses DRX of two types of lengths. Namely, the terminal uses a long DRX and a short DRX. Thus, the terminal in the CELL_PCH may periodically receive a downlink channel according to the long DRX period or a short DRX period to check whether there is data for the terminal. In detail, the terminal first operates according to the long DRX period, and immediately when downlink data is received, the terminal is changed to operate according to the short DRX period and monitors a downlink channel at every short DRX period.

As described above, in the related art, the terminal operates according to the long DRX period until before it receives downlink data, and immediately when the terminal receives the downlink data, it is changed to operate according to the short DRX period and monitors the downlink channel at every short DRX period. After changed to operate according to the short DRX period, if the terminal receives downlink data within a predetermined time, it continuously maintains to be operated according to the short DRX period. If, however, the terminal fails to receive downlink data within the predetermined time after changing to operate according to the short DRX period, the terminal is changed to operate according to the long DRX period.

However, the related art has the following problem. That is, if the UTRAN transmits the downlink data to the terminal operating according to the long DRX period but the terminal does not properly receive the downlink data, the UTRAN will determine that the terminal operates according to the short DRX period but the terminal actually operates according to the long DRX period.

DISCLOSURE OF INVENTION

Technical Solution

Therefore, in order to solve the above addressed matters, the various features described herein have been conceived. One aspect of the exemplary embodiments is to solve an operational error between a UTRAN, namely, a radio network, and a terminal This specification provides discontinuous reception method of a downlink channel whereby when a terminal receives downlink data, it transmits an uplink feedback with respect to the downlink data transmission to a radio network and then receives downlink data according to a particular period after the uplink feedback transmission.

In detail, this specification provides a method for receiving data from a radio network by a terminal including: receiving downlink data while the terminal operates according to a first discontinuous reception period; transmitting a response message with respect to the downlink data; and operating according to a second discontinuous reception (DRX) period after transmitting the response message.

The first discontinuous reception period may be a long DRX period, and the second discontinuous reception period may be a short DRX period.

The downlink data may be an RLC (Radio Link Control) AMD (Acknowledged Mode Data) PDU (Protocol Data Unit) and the downlink data may be received via an HS-DSCH (High-Speed Downlink Shared Channel). The response message may be an RLC ACK (Acknowledgement).

The data reception method may further include: activating a timer with respect to the second discontinuous reception period after the downlink data is received; and operating according to the first discontinuous reception period when the timer expires.

The specification also provides a method for transmitting data to a terminal by a radio network, including: transmitting downlink data while operating according to a first discontinuous period; receiving a response message with respect to the downlink data; and operating according to the second discontinuous period after the response message is received.

In the specification, when a terminal is changed from a continuous reception state to a discontinuous reception state, it first initiates to operate according to a second discontinuous reception period, e.g., a short DRX, to thus solve such an operational error between a radio network and the terminal as in the related art.

In detail, the specification provides a method for receiving data from a radio network by a terminal, including: when the terminal is changed from a continuous reception state to a discontinuous reception state, operating according to a second discontinuous reception period; receiving downlink data according to the second discontinuous reception period; and when a timer with respect to the second discontinuous reception period expires, operating according to the first discontinuous reception period.

The continuous reception state may be a CELL_FACH state, and the discontinuous reception state may be a CELL_PCH state. The first discontinuous reception period may be a long DRX period and the second discontinuous reception period may be a short DRX period.

The present invention has the following advantages.

That is, when a terminal receives downlink data from a radio network, it transmits uplink feedback with respect to the downlink data to the radio network, to thereby solve an operational error between the terminal and the radio network.

In addition, if the terminal is changed from a continuous reception state to a discontinuous reception state, the terminal initiates to operate according to the second discontinuous reception period, e.g., a short DRX period, to thus solve such a problem of an operation error between the radio network and the terminal as in the related art.

The foregoing and other objects, features, aspects and advantages of the present invention will become more apparent from the following detailed description of the present invention when taken in conjunction with the accompanying drawings.

MODE FOR THE INVENTION

Embodiments of the present invention will now be described in detail with reference to the accompanying drawings.

Figure 4:
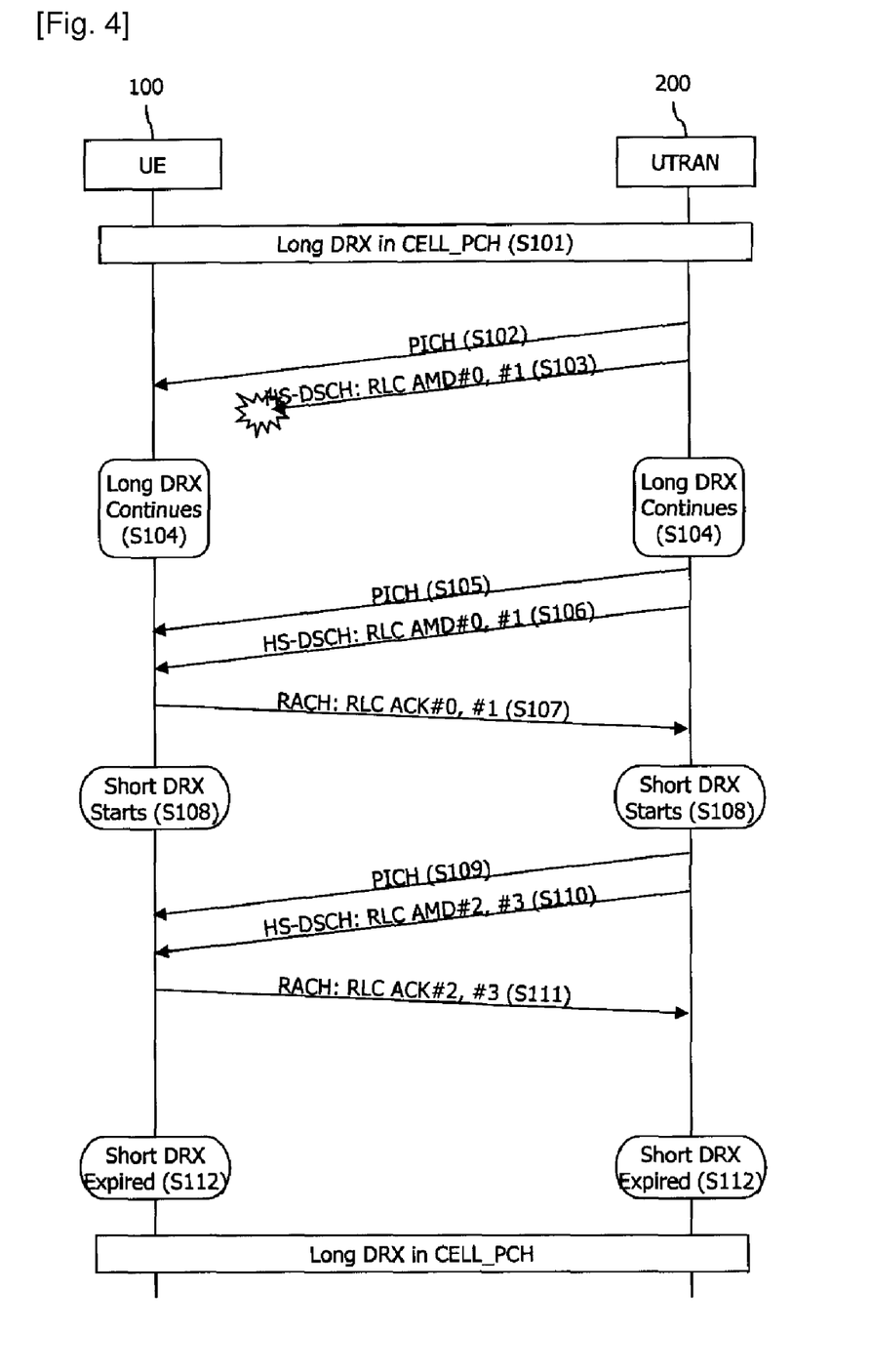
FIG. 4 is a flow chart illustrating the process of a discontinuous reception method according to a first exemplary embodiment of the present invention.
Figure 5:
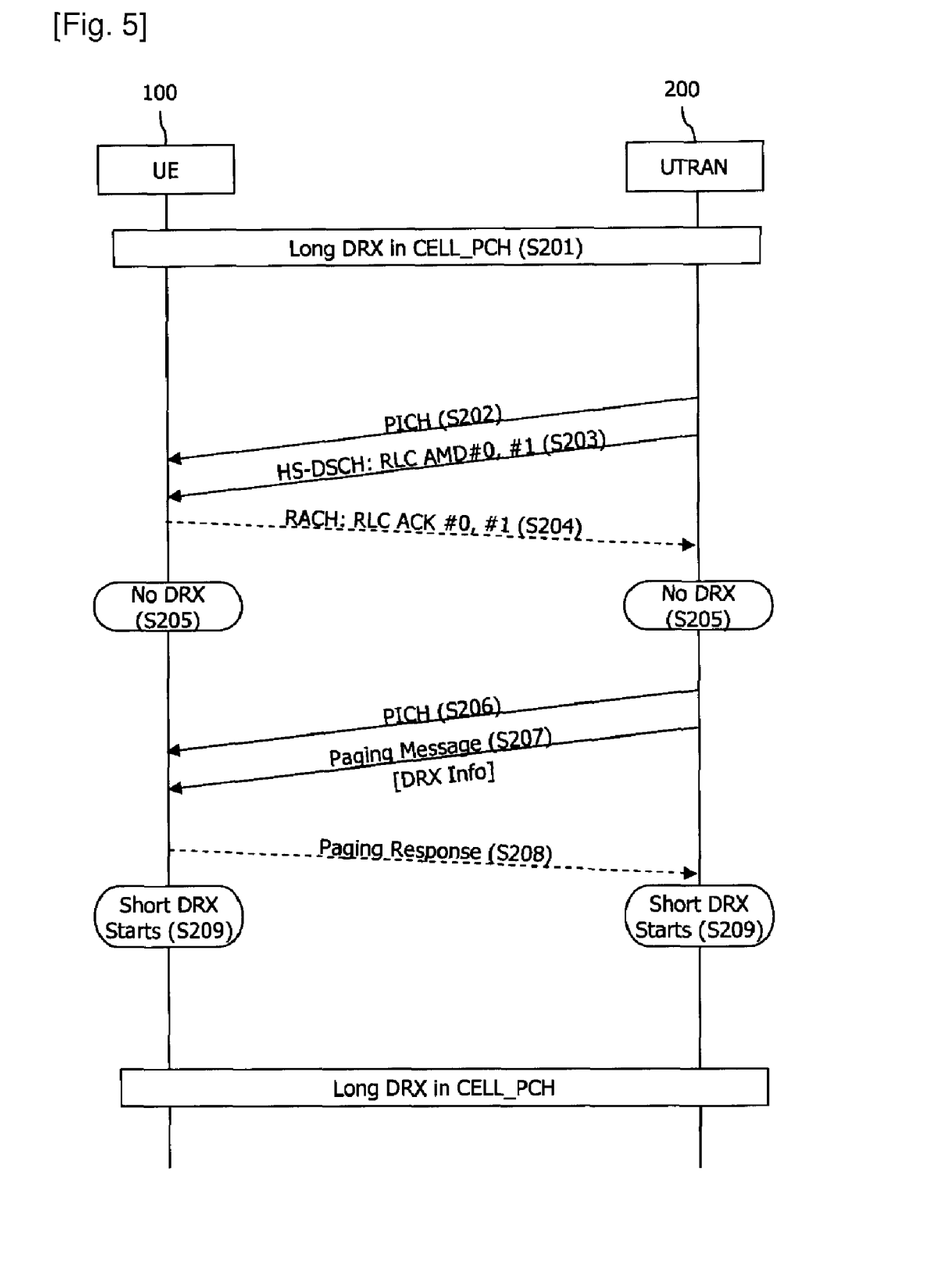
FIG. 5 is a flow chart illustrating the process of a discontinuous reception method according to a second exemplary embodiment of the present invention.

Although a UE (User Equipment) is described in FIGS. 4 and 5, the UE may be called a terminal, an ME (Mobile Equipment), or an MS (Mobile Station). The UE may be a mobile device having a communication function such as a mobile phone, a PDA, a smart phone, notebook computer, etc., or may be a device that cannot be portable such as a PC or a vehicle-mounted device. In FIGS. 4 and 5, a UTRAN (UMTS Terrestrial Radio Access Network) is shown, but the UTRAN may be a wireless access system such as CDMA, CDMA2000, WCDMA, IEEE 802-16, etc.

FIG. 4 is a flow chart illustrating the process of a discontinuous reception method according to a first exemplary embodiment of the present invention.

As shown in FIG. 4, a first exemplary embodiment of the present invention features that when a UE 100 operating according to a first discontinuous reception period, e.g., a long DRX period, receives downlink data from a UTRAN 200, it transmits uplink feedback with respect to the downlink data to the UTRAN 200. This will be described in detail.

1) The UE 100 is in a particular state, e.g., in a CELL_PCH state, and operates according to the first discontinuous reception period, e.g., the long DRX period (S101). Namely, the UE 100 periodically monitors a downlink channel, e.g., a PICH (Paging Indicator Channel), according to the first discontinuous reception period, e.g., according to the long DRX period.

2~3) The UTRAN 200 informs the UE 100 that data will be transmitted (S102). In this case, the information may be provided via the downlink channel, e.g., the PICH. The UTRAN 200 transmits downlink data, e.g., an RLC AMD PDU, to the UE 100 (S103). In this case, the downlink data may be transmitted via a downlink channel, e.g., an HS-DSCH. However, the UE 100 fails to receive the downlink data, e.g., the RLC AMD PDU.

4) Because the UE 100 fails to receive the downlink data, it does not transmit an uplink feedback, e.g., an ARQ or an HARQ feedback, with respect to the downlink data, to the UTRAN 200, but keeps monitoring periodically the downlink channel (e.g., PICH) according to the first discontinuous reception period, e.g., according to the long DRX period (S104).

In this case, because the UTRAN 200 does not receive the uplink feedback, it recognizes that the UE 100 keeps operating according to the first discontinuous reception period, e.g., the long DRX period.

5~6) The UTRAN 200 informs the UE 100 that data will be transmitted (S105) and re-transmits the downlink data, e.g., the RLC AMD PDU, via the downlink channel, e.g., the HS-DSCH, to the UE 100 (S106).

7) If the UE 100 successfully receives the downlink data, the UE transmits an uplink feedback, e.g., the ARQ or the HARQ feedback, with respect to the downlink data to the UTRAN 200 (S107). In this case, the uplink feedback may be an RLC ACK message. The uplink feedback may be transmitted via an uplink channel, e.g., an RACH.

8) The UE 100 is changed to operate according to a second discontinuous reception period, e.g., the short DRX, and discontinuously monitors the downlink channel, e.g., the PICH, according to the second discontinuous reception period (S108). After the UE 100 is changed to operate according to the second discontinuous reception period, the UE 100 activates a timer, e.g., an inactivity timer, with respect to the second discontinuous reception period. In this case, if the UE 100 fails to receive downlink data from the UTRAN 200 until the timer expires, the UE 100 is changed to operate according to the first discontinuous reception period, e.g., the long DRX period.

Meanwhile, upon receiving the uplink feedback, the UTRAN 200 recognizes that the UE 100 operates according to the short DRX period. When the UTRAN 200 receives the uplink feedback, the UTRAN 200 itself may activate a timer.

9~11) Before the timer expires, the UTRAN 200 informs the UE 100 that data will be transmitted (S109), and transmits downlink data, e.g., the RLC AMD PDU, to the UE 100 (S100). Then, the UE 100 transmits an uplink feedback to the UTRAN 200 (S111). The UE 100 maintains to be operated according to the first discontinuous reception period, e.g., the short DRX period.

12) When the timer expires, the UE 100 is changed to operate according to the first discontinuous reception period, e.g., the long DRX period, and monitors the downlink channel according to the first discontinuous reception period (S112). The UTRAN 200 also recognizes that the UE 100 has been changed to operate according to the first discontinuous reception period. In this case, the UTRAN 200 may recognize using its own timer that the UE 100 has been changed to operate according to the first discontinuous reception period.

FIG. 5 is a flow chart illustrating the process of a discontinuous reception method according to a second exemplary embodiment of the present invention.

As noted with reference to FIG. 5, the second embodiment features that when the UE 100, which operates according to the first discontinuous reception period, e.g., the long DRX period, successfully receives downlink data from the UTRAN 200, it stops using the DRX. Further, the second embodiment features that when the UE 100 receives information about the second discontinuous reception period, e.g., the DRX information, from the UTRAN 200, the UE 100 is changed to operate according to the second discontinuous reception period.

1) The UE 100 is in a particular state, e.g., in a CELL_PCH and operates according to the first discontinuous reception period, e.g., the long DRX period (S201). Namely, the UE 100 periodically monitors a downlink channel, e.g., the PICH (Paging Indicator Channel) according to the first discontinuous reception period, e.g., the long DRX period.

2~3) The UTRAN 200 informs the UE 100 that data will be transmitted (S202). Subsequently, the UTRAN transmits downlink data, e.g., the RLC AMD PDU, to the UE 100 (S203). In this case, the information can be provided via the downlink channel, e.g., the PICH. The downlink data may be transmitted via a downlink channel, e.g., the HS-DSCH.

4) When the UE 100 successfully receives the downlink data, e.g., the RLC AMD PDU, the UE 100 selectively transmits an uplink feedback, e.g., ARQ or HARQ feedback, with respect to the downlink data to the UTRAN 200 (S204). Namely, the UE may or may not transmit the uplink feedback. In this case, the uplink feedback may be an RLC ACK message. The uplink feedback may be transmitted via an uplink channel, e.g., the RACH.

5) After transmitting the uplink feedback, the UE 100 may stop using the DRX method, and continuously monitors the downlink channel (S205). Alternatively, the UE may stop using the DRX method and continuously monitors the downlink channel, without transmitting the uplink feedback.

6~7) Thereafter, the UTRAN 200 informs the UE 100 that data will be transmitted. This information may be provided via the downlink channel, e.g., the PICH (S206), and transmits a message including information about a second discontinuous reception period, e.g., DRX information, to the UE 100 (S207).

8) When the UE 100 receives the message, it may selectively transmit a response message, e.g., a paging response, with respect to the received message to the UTRAN 200

(S208). Namely, the UE 100 may or may not transmit the response message. Here, the response message may be an RRC cell update message or an RRC URA update message.

9) And then, the UE 100 is changed to operate at the second discontinuous reception period, e.g., the short DRX period, according to the DRX information of the message, and activates the timer (S209). When the UTRAN 200 receives the response message, e.g., the paging response message, it is changed to operate according to the second discontinuous reception period and activates the timer (S209). Here, the UTRAN 200 operates according to the second discontinuous reception period after receiving the response message, but alternatively, without receiving the response message, the UTRAN 200 may operate according to the second discontinuous reception period and activate the timer. For example, after the UTRAN 200 may transmit the message, e.g., the paging message, it may operate according to the second discontinuous reception period.

Thereafter, if the UE 100 fails to receive downlink data from the UTRAN 200 until the timer expires, the UE 100 is changed to operate according to the first discontinuous reception period, e.g., the long DRX period. If, however, the UE 100 receives downlink data from the UTRAN 200 until before the timer expires, the UE 100 continuously operates according to the second discontinuous reception period, e.g., the short DRX period.

Figure 6:
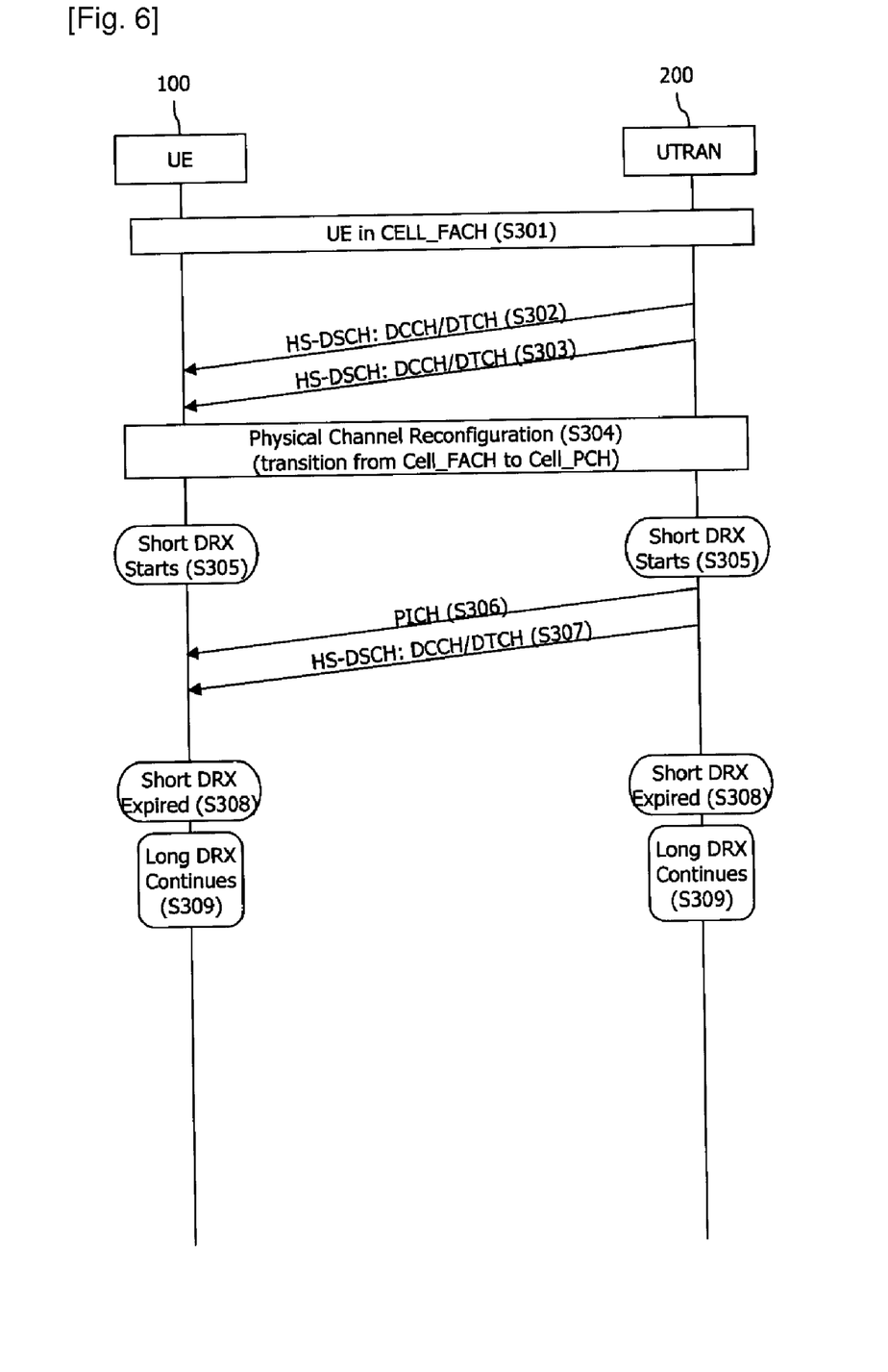
FIG. 6 is a flow chart illustrating the process of a discontinuous reception method according to a third exemplary embodiment of the present invention.

FIG. 6 is a flow chart illustrating the process of a discontinuous reception method according to a third exemplary embodiment of the present invention.

As shown in FIG. 6, the third embodiment of the present invention features that if the UE 100 is changed from a continuous reception state to a discontinuous reception state, e.g., from a CELL_FACH state to a CELL_PCH state, the UE 100 firstly operates according to the second discontinuous reception period, e.g., the short DRX period. This will be described in detail.

1) The UE 100 is in the continuous reception state, e.g., in the CELL_FACH state (S301).

2~3) The UTRAN 200 transmits downlink data to the UE 100 (S302, S303). In this case, the downlink data is delivered via a downlink channel, e.g., an HS-DSCH to which a DCCH (Dedicated Control Channel)/DTCH (Dedicated Traffic Channel) is mapped.

4) The UTRAN 200 and the UE 100 re-configure a physical channel (S304). In detail, the UTRAN 200 changes the UE 100 from a continuous reception state to a discontinuous reception state, e.g., from the CELL_FACH state to the CELL_PCH state.

5) When the UE 100 is changed to the CELL_PCH state, the UE 100 operates according to the second discontinuous reception period, e.g., the short DRX period (S305). At this time, the UE 100 activates the timer with respect to the second discontinuous reception period. The UTRAN 200 also operates according to the second discontinuous reception period, e.g., at the short DRX. The UTRAN 200 may also activate the timer.

6~7) The UTRAN 200 informs the UE 100 that data will be transmitted (S306). In this case, the information may be provided via the downlink channel, e.g., via the PICH. And, the UTRAN 200 transmits the downlink data to the UE 100 (S307). In this case, the downlink data is delivered via the downlink channel, e.g., the HS-DSCH to which the DCCH/DTCH is mapped.

8~9) Thereafter, when the timer with respect to the second discontinuous reception period expires (S308), the UE 100 operates according to the first discontinuous reception period, e.g., the long DRX period (S309). Also, when the timer expires, the UTRAN 200 also operates according to the first discontinuous reception period, e.g., the long DRX period.

As described above, in the third exemplary embodiment of the present invention, if the UE 100 is changed from a continuous reception state to a discontinuous reception state, e.g., from the CELL_FACH state to the CELL_PCH state, the UE 100 operates according to the second discontinuous reception period, e.g., the short DRX period, whereby an operational error between the UTRAN 200 and the UE 100 can be resolved.

Although not shown, fourth to sixth exemplary embodiments of the present invention will now be described.

The fourth to sixth exemplary embodiments of the present invention relates to a case where the UE 100 receives DCCH/DTCH transmission data via the downlink channel, e.g., the HS-DSCH in the discontinuous reception state, e.g., the CELL_PCH state, a case where the UE 100 in the discontinuous reception state, e.g., the CELL_PCH state receives the DCCH/DTCH data in an RLC AM (Acknowledged Mode) via a downlink channel, e.g., the HS-DSCH, and transmits a response message, e.g., an RLC ACK message, with respect to the DCCH/DTCH data to the UTRAN 200, or a case where the UE 100 in the CELL_PCH state receives the DCCH/DTCH data in the RLC UM (Unacknowledged Mode) via a downlink channel, e.g., the HS-DSCH.

First, the fourth exemplary embodiment of the present invention will now be described. The UE 100 continuously receives downlink data via a downlink channel, e.g., via the HS-DSCH. And, when the UE 100 receives a message, e.g., a paging message, including information of a second discontinuous reception period, e.g., DRX information from the UTRAN 200, the UE 100 activates the timer, e.g., a short DRX timer, according to the DRX information. And then, the UE 100 starts to operate according to the second discontinuous reception period, e.g., the short DRX period. In this case, the UE 100 starts to operate according to the second discontinuous reception period in the discontinuous reception state, e.g., the CELL_PCH state. When the timer, e.g., the short DRX timer, expires, the UE 100 operates according to the first discontinuous reception period, e.g., the long DRX period.

Although not shown, the fifth exemplary embodiment of the present invention will now be described.

The UE receives the downlink data via the downlink channel, e.g., the HS-DSCH, in the CELL_PCH state. And, when the UE 100 receives a message, e.g., a paging message, including information of the second discontinuous reception period, e.g., the DRX information, from the UTRAN 200, the UE 100 transmits a response message, e.g., an RRC response message, to the UTRAN 200 without being changed from the CELL_PCH state to the CELL_FACH state. In this case, the DRX information includes information about the timer, and DRX cycle information. The response message may be a Cell Update message or a URA update message. The UE 100 activates the timer, e.g., the short DRX timer and starts to operate according to the second discontinuous reception period, e.g., the short DRX period, in the CELL_PCH state. When the timer, e.g., the short DRX timer, expires, the UE 100 operates according to the second discontinuous reception period, e.g., the long DRX period.

Although not shown, the sixth exemplary embodiment of the present invention will now be described.

When the UTRAN 200 transmits downlink data, the UE activates the timer and continuously receives the downlink data in the CELL_PCH state. In this case, the downlink data is received via the HS-DSCH. Thereafter, when the timer expires, the UE 100 performs the long DRX.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for receiving data from a radio network by a terminal comprising:
    receiving downlink data while the terminal operates according to a first discontinuous reception period;
    transmitting a response message with respect to the downlink data; and
    operating according to a second discontinuous reception (DRX) period after transmitting the response message,
    wherein the first discontinuous reception period is a long DRX period and the second discontinuous period is a short DRX period,
    wherein the downlink data is an RLC (Radio Link Control) AMD (Acknowledged Mode Data) PDU (Protocol Data Unit) received via an HS-DSCH (High-Speed Downlink Shared Channel),
    wherein the response message is an RLC ACK (Acknowledgement) transmitted via a RACH (Random Access Channel),
    wherein all the steps are performed when the terminal is in a CELL_PCH state.

2. The method of claim 1, further comprising; activating a timer with respect to the second discontinuous reception period after the downlink data is received; and operating according to the first discontinuous reception period when the timer expires.

3. A method for transmitting data to a terminal by a radio network, comprising:
    transmitting downlink data while operating according to a first discontinuous period;
    receiving a response message with respect to the downlink data; and
    operating according to a second discontinuous period after the response message is received,
    wherein the first discontinuous reception period is a long DRX period and the second discontinuous period is a short DRX period,
    wherein the downlink data is an RLC (Radio Link Control) AMD (Acknowledged Mode Data) PDU (Protocol Data Unit) transmitted via an HS-DSCH (High-Speed Downlink Shared Channel),
    wherein the response message is an RLC ACK (Acknowledgement) received via a RACH (Random Access Channel),
    wherein all the steps are performed when the terminal is in a CELL_PCH state.

4. The method of claim 3, further comprising; activating a timer with respect to the second discontinuous period after the response message is received; and operating according to the first discontinuous period when the timer expires.

* * * * *